United States Patent
Takada et al.

(10) Patent No.: US 7,377,631 B2
(45) Date of Patent: *May 27, 2008

(54) AQUEOUS INK, SET OF REACTION LIQUID AND AQUEOUS INK, AND IMAGE FORMING METHOD

(75) Inventors: Yoichi Takada, Yokohama (JP); Junichi Sakai, Tokyo (JP); Fumiaki Fujioka, Tokyo (JP); Yasuhiro Nito, Yokohama (JP); Masashi Tsujimura, Kawasaki (JP); Takashi Imai, Yokohama (JP); Shinichi Hakamada, Kawasaki (JP); Sadayuki Sugama, Tsukuba (JP); Shinya Mishina, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

This patent is subject to a terminal disclaimer.

(21) Appl. No.: 11/224,993

(22) Filed: Sep. 14, 2005

(65) Prior Publication Data

US 2006/0007288 A1    Jan. 12, 2006

Related U.S. Application Data

(63) Continuation of application No. PCT/JP2005/005304, filed on Mar. 16, 2005.

(30) Foreign Application Priority Data

| Mar. 16, 2004 | (JP) | ............................. 2004-075358 |
| Mar. 16, 2004 | (JP) | ............................. 2004-075359 |
| Mar. 16, 2004 | (JP) | ............................. 2004-075360 |
| Mar. 10, 2005 | (JP) | ............................. 2005-067994 |

(51) Int. Cl.
*C09D 11/00* (2006.01)

(52) U.S. Cl. ................. 347/100; 106/31.13; 428/32.38

(58) Field of Classification Search ................ 347/100; 106/31.13; 428/32.38
See application file for complete search history.

(56) References Cited

U.S. PATENT DOCUMENTS 4,313,124 A    1/1982    Hara ....................... 346/140 R (Continued)

FOREIGN PATENT DOCUMENTS

JP    54-56847    5/1979

(Continued)

OTHER PUBLICATIONS

International Preliminary Report on Patentability and Written Opinion of the International Searching Authority for PCT/JP2005/005304, with translations (14 pages).

*Primary Examiner*—Manish S. Shah
*Assistant Examiner*—Laura E Martin
(74) *Attorney, Agent, or Firm*—Fitzpatrick, Cella, Harper & Scinto

(57) ABSTRACT

An aqueous ink, by which stable ink-jet recording can be conducted irrespective of printing environment, a substantially even image having abrasion resistance can be formed, no image soiling is caused even upon double-side printing, and a high-quality image improved in unclearness at a contour portion of the image and free from occurrence of color bleed can be provided, is provided. The aqueous ink is an aqueous ink used in a system that a reaction liquid containing at least a polyvalent metal and an aqueous ink containing at least a pigment dispersion, in which a pigment is dispersed with an anionic polymer dispersant, are used to form an image, wherein the aqueous ink satisfies specific condition.

18 Claims, 4 Drawing Sheets

U.S. PATENT DOCUMENTS

| | | | |
|---|---|---|---|
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,218,376 A | 6/1993 | Asai | 347/61 |
| 6,027,210 A | 2/2000 | Kurabayashi et al. | 347/100 |
| 6,084,619 A | 7/2000 | Takemoto et al. | 347/96 |
| 6,155,673 A | 12/2000 | Nakajima et al. | 347/61 |
| 6,221,141 B1 | 4/2001 | Takada et al. | 106/31.6 |
| 6,238,045 B1 | 5/2001 | Ono et al. | 347/96 |
| 6,280,513 B1 | 8/2001 | Osumi et al. | 106/31.6 |
| 6,286,953 B1 | 9/2001 | Takemoto et al. | 347/100 |
| 6,332,919 B2 | 12/2001 | Osumi et al. | 106/31.6 |
| 6,375,317 B1 | 4/2002 | Osumi et al. | 347/100 |
| 6,425,662 B1 | 7/2002 | Teraoka et al. | 347/100 |
| 6,460,987 B1 * | 10/2002 | Katsuragi et al. | 347/100 |
| 6,474,804 B2 | 11/2002 | Osumi et al. | 347/100 |
| 6,506,239 B1 | 1/2003 | Osumi et al. | 106/31.27 |
| 6,511,534 B1 | 1/2003 | Mishina et al. | 106/31.33 |
| 6,521,034 B1 | 2/2003 | Osumi et al. | 106/31.6 |
| 6,533,853 B1 | 3/2003 | Mishina et al. | 106/31.6 |
| 6,547,381 B2 | 4/2003 | Watanabe et al. | 347/100 |
| 6,557,991 B2 * | 5/2003 | Koitabashi et al. | 347/101 |
| 6,572,692 B1 | 6/2003 | Osumi et al. | 106/31.6 |
| 6,663,237 B2 | 12/2003 | Ishinaga et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 2005/0219341 A1 * | 10/2005 | Nito et al. | 347/100 |
| 2006/0007288 A1 | 1/2006 | Takada et al. | 347/100 |

FOREIGN PATENT DOCUMENTS

| | | |
|---|---|---|
| JP | 59-123670 | 7/1984 |
| JP | 59-138461 | 8/1984 |
| JP | 60-71260 | 4/1985 |
| JP | 6-106735 | 4/1994 |
| JP | 9-207424 | 8/1997 |
| JP | 9-286940 | 11/1997 |
| JP | 10-60352 | 3/1998 |
| JP | 2783647 B2 | 8/1998 |
| JP | 11-34478 | 2/1999 |
| JP | 11-78212 | 3/1999 |
| JP | 2000-44855 | 2/2000 |

* cited by examiner

AQUEOUS INK, SET OF REACTION LIQUID AND AQUEOUS INK, AND IMAGE FORMING METHOD

This application is a continuation of International Application No. PCT/JP2005/005304, filed on Mar. 16, 2005, which claims the benefit of Japanese Application Nos. 2004-075358 filed Mar. 16, 2004, 2004-075359 filed Mar. 16, 2004, 2004-075360 filed Mar. 16, 2004, 2005-067994 filed Mar. 10, 2005.

BACKGROUND OF THE INVENTION

1. Field of the Invention

The present invention relates to an aqueous ink used in a system that a reaction liquid and an aqueous ink are used to form an image, a set of a reaction liquid and an aqueous ink, and an image forming method.

2. Related Background Art

Ink-jet recording is a printing method that minute droplets of an ink are ejected to apply them to a recording medium such as paper, thereby conducting printing, has a feature that high-resolution and high-quality images can be printed at high speed by a cheap apparatus and has been commonly used as means capable of simply forming high-quality color images in recent years. There is however a strong demand for formation of higher-quality color images.

On the other hand, various proposals have heretofore been made for forming higher-quality color images. For example, it has been proposed to use a black ink having characteristics of thickening or aggregating by an action with a salt and a color ink containing the salt in combination, thereby providing high-quality color images high in image density and free from occurrence of color bleed (bleeding due to color mixing between different colors) (see, for example, Japanese Patent Application Laid-Open No. H6-106735). In other words, according to this method, 2 inks different in properties from each other, i.e., the color ink containing the salt, which is a second liquid, and the black ink, which is a first liquid, are used to form a print, whereby components in these two liquids are caused to react to form aggregates of colorants, thereby permitting formation of good-quality images. Specifically, a salt of a polyvalent metal ion is used as the salt.

Various proposals have also been made as to formation of high-quality color images by using a set composed of a combination of a liquid composition containing no colorant and an ink, i.e., 2 liquids different in properties from each other (see, for example, Japanese Patent Application Laid-Open Nos. H9-207424, H11-78212, 2000-44855 and H9-286940).

The present inventors have carried out a further extensive investigation as to the ink sets containing the polyvalent metal salt among these proposals. As a result, it has been confirmed that printing is conducted by such a printing method as disclosed in Japanese Patent Application Laid-Open Nos. H6-106735 and H11-78212, whereby high-quality color images high in image density and free from occurrence of color bleed can be provided. However, this recording method involves a new problem because of too high reactivity.

More specifically, a reaction is almost completed at a point of time (from the moment of contact to several hundreds milliseconds) the reaction liquid has come into contact with the ink because the reactivity is too high. As a result, a color material component reacted with the reaction liquid is in a state remained on a surface-layer portion of the recording medium. It goes without saying that the colorant component may be removed in some cases when a printed portion is rubbed. Such a phenomenon possibly causes a trouble upon double-side printing.

In order to solve this problem, it has been confirmed that a substance for increasing binding property is added into an ink, whereby permeation of a colorant is controlled, and a film may be formed on the recording medium to have an effect on abrasion at the recorded portion as disclosed in Japanese Patent Application Laid-Open Nos. H9-207424, 2000-44855 and H9-286940.

On the other hand, it is important to eject an ink as stable droplets from a minute nozzle of an ink-jet recording head for stably forming high-quality ink-jet recorded images. Specifically, it is important that the ink is prevented from solidifying in orifices of the ink-jet recording head due to drying of the ink in the orifices in order to conduct stable ink-jet recording. Such an ink containing the substance having binding ability as described above involves a problem in this regard. More specifically, a low-hydrophilic resin emulsion or the like, which is the substance having binding ability, adheres to orifices or the like of the ink-jet recording head, whereby clogging may be caused at the orifices in some cases.

SUMMARY OF THE INVENTION

It is therefore an object of the present invention to provide an aqueous ink, a set of a reaction liquid and an aqueous ink and an image forming process, by which stable ink-jet recording can be conducted irrespective of printing environment, an image having substantially even abrasion resistance can be formed on a recording medium, no image soiling is caused even upon double-side printing, and a high-quality image with less unclearness at a contour portion of the image and free from occurrence of color bleed can be provided.

The present inventors have found in the course of an investigation to solve the above-described problems involved in the prior art that when the reactivity between a reaction liquid and an aqueous ink containing a pigment dispersion dispersed with an anionic polymer dispersant is controlled within a certain range, adhesiveness between colorant aggregates and the surface of a recording medium, and abrasion resistance of a printed area after printing are easily improved on the recording medium. The present invention has been led to completion on the basis of this finding.

According to the present invention, there is thus provided an aqueous ink used in a system that a reaction liquid containing at least a polyvalent metal and an aqueous ink containing at least a pigment dispersion, in which a pigment is dispersed with an anionic polymer dispersant, are used to form an image, wherein the aqueous ink satisfies the following condition.

Taking as (A) absorbance at a maximum absorption wavelength in a visible region (at a wavelength of 550 nm when carbon black is used as the pigment) of a mixture of 50 g of a 800-times diluted aqueous solution of the reaction liquid and 0.3 g of a 5-times diluted aqueous solution of the aqueous ink being filtered through a filter having a pore size of 0.2 µm after 15 minutes, and as (B) an absorbance at a maximum absorption wavelength in the visible region of a mixture of 0.3 g of the 5-times diluted aqueous solution of the aqueous ink and 50 g of pure water, (A) and (B) satisfy the following relationship:

$$0.3 < (A)/(B) < 0.85.$$

In another embodiment of the aqueous ink according to the present invention, the anionic polymer dispersant contained in the aqueous ink in the above-described constitution may have a component which controls the reaction of the aqueous ink and the polyvalent metal. In particular, the component which controls the reaction with the polyvalent metal may be a nonionic substituent group. More specifically, the anionic polymer dispersant may be a polymer containing, as the nonionic substituent group, at least a monomer of a formula (1) in a structural unit, and the proportion of the structural unit may be from 5 mass % to 50 mass % based on a total amount of the polymer:

$$CH_2=C(R_1)COOR_2 \qquad \text{formula (1):}$$

wherein $R_1$ is hydrogen or a methyl group, $R_2$ is $-(CH_2CH_2O)_n-R_3$ (n being an integer of 1 to 30), and $R_3$ is hydrogen or a methyl group.

In a further embodiment of the aqueous ink according to the present invention, the anionic polymer dispersant in the above-described constitution may comprise at least one selected from a monomer of a formula (2) and a monomer of a formula (3) as a structural unit:

$$CH_2=C(R_4)-R_5 \qquad \text{formula (2):}$$

wherein $R_4$ is hydrogen or a methyl group, and $R_5$ is a phenyl or naphthyl group; and $$CH_2=C(R_6)COOR_7 \qquad \text{formula (3):}$$

wherein $R_6$ is hydrogen or a methyl group, and $R_7$ is a linear, branched or alicyclic alkyl or alkenyl group having 6 to 18 carbon atoms, or a benzyl group.

In the above constitution, it may be preferable that the anionic polymer dispersant comprises at least one selected from a monomer of the formula (2) and a monomer of the formula (3) as a structural unit, and the proportion of the structural unit be from 20 mass % to 80 mass % based on the total amount of the polymer. It may also be preferable that the pigment dispersion be such that 100 parts by mass of the pigment is dispersed with 20 parts by mass to 200 parts by mass of the anionic polymer dispersant.

In a still further embodiment of the aqueous ink according to the present invention, when at least two anionic polymers (hereinafter referred to as Polymer (I) and Polymer (II)) are used as the anionic polymer dispersant, Polymer (I) may comprise at least one selected from a monomer of a formula (4) and a monomer of a formula (5) as a structural unit, and a proportion of the structural unit may be from 50 mass % to 80 mass % based on the total amount of Polymer (I):

$$CH_2=C(R_8)-R_9 \qquad \text{formula (4):}$$

wherein $R_8$ is hydrogen or a methyl group, and $R_9$ is a phenyl or naphthyl group; and $$CH_2=C(R_{10})COOR_{11} \qquad \text{formula (5):}$$

wherein $R_{10}$ is hydrogen or a methyl group, and $R_{11}$ is a linear, branched or alicyclic alkyl or alkenyl group having 4 to 18 carbon atoms, or a benzyl group.

Further, Polymer (I) may preferably comprise styrene as a structural unit.

On the other hand, Polymer (II) may be a polymer containing at least a monomer represented by a formula (6) as a structural unit, and the proportion of the structural unit may be from 20 mass % to 80 mass % based on the total amount of Polymer (II):

$$CH_2=C(R_{12})COOR_{13} \qquad \text{formula (6):}$$

wherein $R_{12}$ is hydrogen or a methyl group, and $R_{13}$ is a linear or branched alkyl group having less than 4 carbon atoms.

In a yet still further embodiment of the aqueous ink according to the present invention, Polymer (II) may compnse a monomer having a nonionic substituent group as a structural unit, more specifically, a monomer represented by a formula (7) as a structural unit, and the proportion of the structural unit may be from 5 mass % to 50 mass % based on the total amount of Polymer (II):

$$CH_2=C(R_{14})COOR_{15} \qquad \text{formula (7):}$$

wherein $R_{14}$ is hydrogen or a methyl group, $R_{15}$ is $-(CH_2CH_2O)_n-R_{16}$ (n being an integer of 1 to 30), and $R_{16}$ is hydrogen or a methyl group.

Further, it may be preferable that the total mass of Polymer (I) and Polymer (II) be from 20 parts by mass to 200 parts by mass per 100 parts by mass of the pigment, and the proportion of Polymer (I) to Polymer (II) be from 10 parts by mass to 300 parts by mass per 100 parts by mass of Polymer (I).

According to the present invention, there is also provided a set of a reaction liquid and an aqueous ink, wherein the reaction liquid contains at least a polyvalent metal, and the aqueous ink is an ink composed of any of the constitutions described above.

According to the present invention, there is further provided an image forming method comprising using the above-described set of the reaction liquid and the aqueous ink and applying the reaction liquid in an amount of from 0.5 g/m² to 5 g/m² to a recording medium.

In another embodiment of the image forming method according to the present invention, there is provided an image formation method for forming an image on a recording medium, which comprises the steps of (i) applying to the recording medium by an ink-jet recording method an aqueous ink which composes a set of a reaction liquid containing at least a polyvalent metal and the aqueous ink containing at least a pigment dispersion in which a pigment is dispersed with an anionic polymer dispersant; and (ii) applying to the recording medium, the reaction liquid which composes the set of the reaction liquid containing at least the polyvalent metal and the aqueous ink containing at least the pigment dispersion in which the pigment is dispersed with the anionic polymer dispersant, wherein the step (i) is conducted after the fixation of the reaction liquid to the recording medium is completed in the step (ii).

According to the present invention, stable ink-jet recording can be conducted irrespective of printing environment, and an image having substantially uniform abrasion resistance can be formed on a recording medium. In addition, a high-quality image with less unclearness at a contour portion of the image and free from occurrence of color bleed can be provided.

DESCRIPTION OF THE PREFERRED EMBODIMENTS

The present invention will hereinafter be described in more detail by the preferred embodiments.

According to the present invention, an aqueous ink containing an anionic polymer dispersant having a component for controlling the reactivity between a reaction liquid and the ink within a certain range, and the reaction liquid are used in combination, whereby pigment aggregates can be prevented from being localized on the surface of a recording medium, and adhesiveness between the colorant aggregates and the surface of the recording medium, and abrasion resistance of a printed area after printing can be easily improved on the recording medium. The reason why the above-described effect is developed by the above-described constitution of the present invention is considered to be attributable to the fact that the reaction liquid and the ink are in the following state on the recording medium.

FIGS. 1A to 1D are conceptual views illustrating a state from the impact of an ink droplet 1 ejected from a head on a region 2 of a recording medium, to which a reaction liquid was applied, to the formation of aggregates (print) of particles of a pigment 3 that is a colorant on the recording medium.

The ink droplet 1 permeates into the recording medium in order of 1A→1B→1C→1D in the depth direction of the recording medium after it impacts on the recording medium to form aggregates by a reaction of the pigment 3 with a polyvalent metal. When the reactivity between the reaction liquid and the aqueous ink is controlled within the range according to the present invention, the ink droplet 1 reacts while gradually permeating toward the depth direction of the recording medium to form the aggregates. Accordingly, the aggregates are not localized on the surface of the recording medium, but present in a state distributed in a certain depth from the surface of the recording medium.

In other words, the reactivity between the reaction liquid and the aqueous ink is controlled within the range according to the present invention, whereby the reaction between a pigment dispersion and the polyvalent metal takes place after the ink droplet 1 impacts on the surface of the recording medium (1B). At this time, a certain amount of the pigment dispersion reacts with the polyvalent metal in the vicinity of the surface of the recording medium, and the remaining amount of the pigment dispersion continues to further permeate in the depth direction of the recording medium to react with the polyvalent metal applied to a position deeper than the polyvalent metal that has reacted in the state of 1B (1C). Further, the same process also occurs in the state of 1C to change to a state of 1D.

Figure 1A:
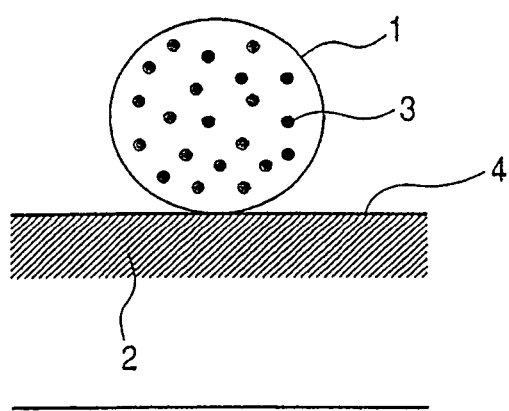
FIGS. 1A, 1B, 1C and 1D illustrate a process after an ink droplet ejected from a head has been impacted on a recording medium.
Figure 1B:
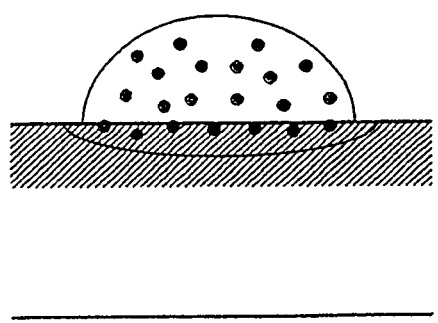
Figure 1C:
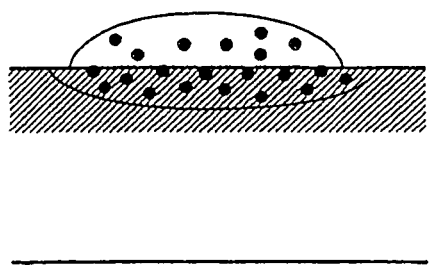
Figure 1D:
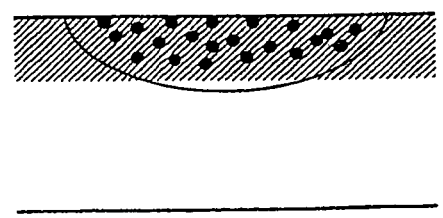
Figure 2A:
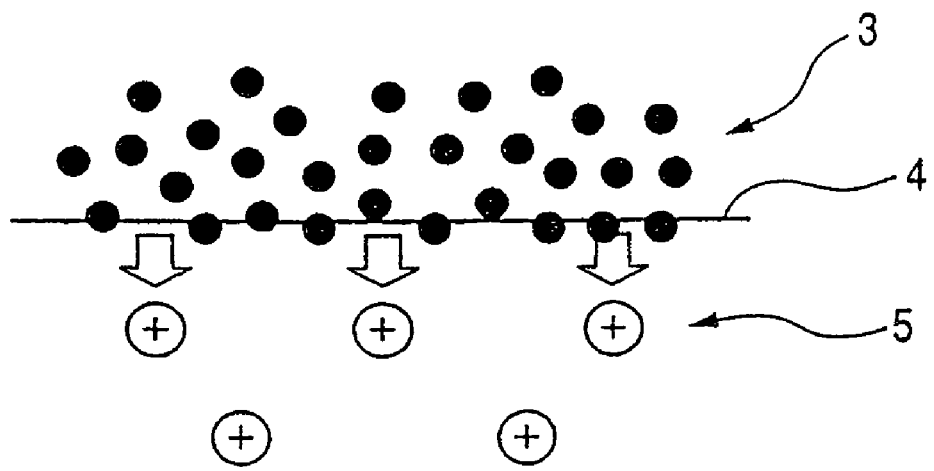
FIGS. 2A, 2B and 2C illustrate a process after an ink droplet ejected from a head has been impacted on a recording medium.
Figure 2B:
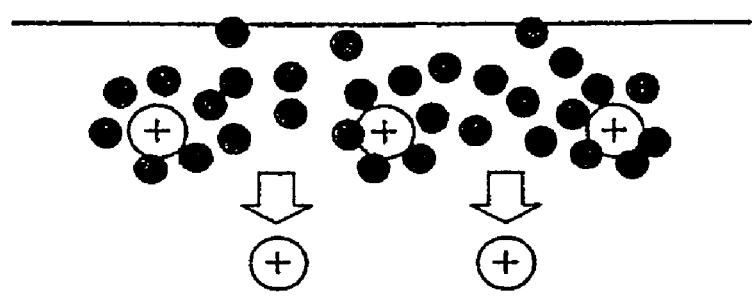
Figure 2C:
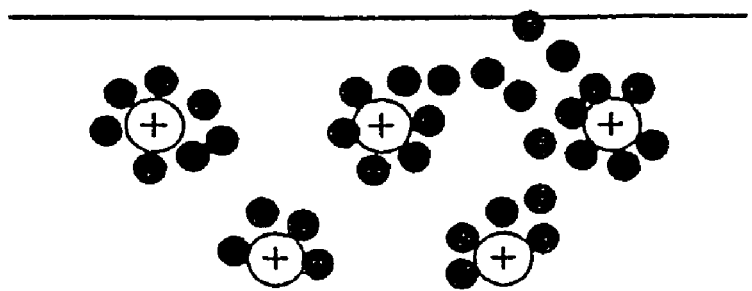

FIGS. 2A to 2C illustrate a process of forming aggregates distributed in a certain depth from the surface 4 of a recording medium in more detail. After the ink droplet impacts on the recording medium, an aggregating reaction of the pigment 3 with the polyvalent metal 5 starts on the surface 4 of the recording medium with the permeation of the ink (a state of 2A). When the pigment 3 arrives about the polyvalent metal 5 located at the surface-layer portion of the recording medium in the drawings, aggregation of the pigment 3 with the polyvalent metal 5 takes place. At this time, since the reactivity between the polyvalent metal 5 and the pigment 3 is controlled, the polyvalent metal 5 present in the vicinity of the surface undergoes a reaction with a certain amount of the pigment dispersion. Since the polyvalent metal 5 reacted with the pigment dispersion lowers its reactivity, all the pigment 3 does not react sequentially in the vicinity of the surface-layer portion of the recording medium. In other words, about the polyvalent metal 5 at the surface-layer portion of the recording medium, aggregates formed by the reaction with a certain amount of the pigment dispersion and an unreacted pigment dispersion are present to bring about a state of 2B. Thereafter, the unreacted pigment dispersion further permeates in the depth direction of the recording medium and arrives about the polyvalent metal located in the interior of the recording medium in the drawings to form aggregates, thereby changing to a state of 2C. Such partial aggregation and permeation are repeated to form pigment aggregates (print) in a state distributed in a certain depth from the surface 4 of the recording medium as illustrated in FIG. 1D.

A great difference between the system that a conventional aqueous ink and a reaction liquid are used to form an image and the present invention resides in that the abrasion resistance of the resulting print is improved by controlling the reactivity between the colorant in the ink and the reactive component in the reaction liquid even when a substance (excluding a dispersant for surely retaining the dispersion stability of the pigment) having binding ability is not contained in the ink.

In the system that the conventional aqueous ink and the reaction liquid are used to form an image, the reactivity between the colorant in the ink and the reactive component in the reaction liquid is more enhanced to rapidly form aggregates for the purpose of improving resistance to bleeding and fixing ability of a resulting image. For example, when an ink containing a styrene-acrylic acid copolymer having an acid value of about 210 is reacted with a reaction liquid containing a calcium ion having relatively strong reactivity on a recording medium as disclosed in Examples of Japanese Patent Application Laid-Open No. H11-78212, the reactivity between these 2 liquids is too high, so that colorant aggregates are unnecessarily distributed in the surface-layer portion of the recording medium not to reach the level of the abrasion resistance achieved by the present invention. As disclosed in Japanese Patent Application Laid-Open No. H9-286940, there are a great number of proposals, in which the details of an anionic polymer dispersant in an ink are not described. Since these prior art documents have their objects of increasing the reactivity between a colorant in an ink and a reactive component in a reaction liquid to rapidly form aggregates, colorant aggregates become unnecessarily present in the surface-layer portion of the recording medium not to reach the level of the abrasion resistance achieved by the present invention like Japanese Patent Application Laid-Open No. H11-78212.

On the other hand, when the aqueous ink according to the present invention and a reaction liquid are used to form an image, the reactivity between them is exactly controlled so as to achieve somewhat weak reactivity compared with the reactivity between the conventional ink and the reaction liquid, so that colorant aggregates can be prevented from being localized on the surface-layer portion of the recording medium and can be distributed in a certain depth from the surface-layer portion of the recording medium. As a result, the abrasion resistance of the resulting print has been able to be more improved while retaining the bleeding of the print to the same level compared with the recorded article obtained by using the conventional ink and the reaction liquid to form the image.

The greatest point of the present invention resides in that a method of controlling the reactivity between the aqueous ink and the reaction liquid, which has heretofore not been considered as a means for improving the abrasion resistance when the two-liquid system is used, has been found.

The present inventors have carried out a still further extensive investigation. As a result, they have come to conclude that when the ink according to the present invention, which is exactly controlled so as to achieve somewhat weak reactivity compared with the reactivity between the conventional ink and the reaction liquid, and the reaction liquid are used to form an image, a more amount of the reactive component is more preferably caused to be present in the surface-layer portion of recording medium in a state before the ink is applied to the recording medium in view of the permeation rate of the liquid and the speed at forming aggregates. In other words, it has been found that distribution of the aggregates in a certain depth from the surface-layer portion of the recording medium, which is the greatest point of the present invention, can be more easily achieved by specifying the amount and permeation rate of the reaction liquid applied, the time period between application of the reaction liquid to the recording medium and application of the ink thereon, and the like.

From the above, taking the constitutional feature of the present invention that the reactivity between the reaction liquid and the aqueous ink containing the anionic polymer dispersant is controlled within a certain range, stable image recording becomes feasible irrespective of printing environment, the effect that the abrasion resistance can be more effectively improved is achieved, and moreover troubles such as image soiling upon double-side printing can be effectively prevented.

Respective components making up the aqueous ink and reaction liquid according to the present invention, and the like will hereinafter be described.

Reactivity Between Reaction Liquid and Aqueous Ink

The reactivity between the reaction liquid and aqueous ink according to the present invention is essentially controlled so as to satisfy the following condition.

Taking as (A) an absorbance at a maximum absorption wavelength in a visible region (at a wavelength of 550 nm when carbon black is used as the pigment) of a mixture of 50 g of a 800-times diluted aqueous solution of the reaction liquid and 0.3 g of a 5-times diluted aqueous solution of the aqueous ink being filtered through a filter having a pore size of 0.2 µm 15 minutes after preparation of the mixture, and as (B) an absorbance at a maximum absorption wavelength in the visible region of a mixture of 0.3 g of the 5-times diluted aqueous solution of the aqueous ink and 50 g of pure water, (A) and (B) satisfy the following relationship:

$$0.3<(A)/(B)<0.85.$$

If (A)/(B) is lower than 0.3, pigment aggregates are localized on the surface of a recording medium, so that the abrasion resistance of the resulting print is lowered, and such as image soiling upon double-side printing may be caused in some cases. If (A)/(B) is higher than 0.85 on the other hand, the reactivity between the reaction liquid and the aqueous ink is too weak, so that such a drawback that a high-quality color image high in image density and free from occurrence of color bleed, which is a typical benefit of the two-liquid system, cannot be obtained may be caused in some cases.

Components of Aqueous Ink

Anionic Polymer Dispersant (A) Case where One Polymer Dispersant is Used:

The polymer dispersant is preferably a polymer or copolymer of a monomer component having a radically polymerizable unsaturated bond, such as an acrylic resin or styrene/acrylic resin from the viewpoints of being generally usable and simply conducting functional design of the dispersant. In the present invention, in particular, the dispersant more preferably contains a component which controls the reactivity between the reaction liquid and the ink within a certain range for the purpose of controlling the permeability of a colorant into a recording medium, in addition to an anionic component for obtaining anionicity, which reacts with a polyvalent metal. Examples of the component which controls the reactivity between the reaction liquid and the ink within a certain range include nonionic substituent groups having high hydrophilicity, such as a hydroxyl group and an ether group such as polyethylene ether. For example, the use of a (meth)acrylic ester having a polyethylene glycol substituent represented by the formula (1) as the component which controls reactivity between the reaction liquid and the ink within a certain range is preferred because the reactivity with the polyvalent metal can be freely controlled by adjusting copolymerization ratio between monomer components or changing the chain length (repeating unit) of ether in the polyethylene ether.

The reason why the reactivity between the aqueous ink and the reaction liquid can be controlled by containing the monomer having the high-hydrophilic nonionic substituent group in the polymer dispersant is considered to be as follows. Since a monomer having anionicity in a solution produces a reacting action by contact with that having cationicity, such as a polyvalent metal ion though the reactivity varies more or less, it is very difficult to specify the reactivity between the aqueous ink and the reaction liquid like the present invention. On the other hand, a monomer having no ionicity in a solution, i.e. a monomer having nonionicity, does not bring about a reacting action even when it is brought into contact with that having cationicity, such as a polyvalent metal ion. Accordingly, it is possible with ease to delicately control the reactivity between the aqueous ink and the reaction liquid like the present invention.

By containing the monomer having the high-hydrophilic nonionic substituent group in the polymer dispersant, the abrasion resistance of an image formed by using the reaction liquid and the aqueous ink is improved, which is a new effect. The reason why the abrasion resistance is improved is considered to be as follows. When a reaction liquid comes into contact with an ink on a recording medium, a polymer dispersant contained in the ink also reacts with a polyvalent metal ion contained in the reaction liquid to form a film by bonding them to each other. Since the polymer dispersant forming the film by the reaction with the polyvalent metal ion is high in reactivity, however, it is very difficult to form the film in the form of including a pigment. Since the monomer having the nonionic substituent group, which does not cause a reaction even when it comes into contact with the reaction liquid, does not form a film at the moment that the ink has been applied to the recording medium, but slowly forms a film as evaporation or permeation of the liquid components within the recording medium progresses, the film is formed in the form of including the pigment. As a result, it is considered that the polymer dispersant containing the monomer having the nonionic substituent group more improves the abrasion resistance than the polymer dispersant not containing said monomer.

Specific examples of other radically polymerizable monomers include (meth)acrylic esters such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate and benzyl methacrylate; styrene monomers such as styrene, α-methylstyrene, o-methylstyrene, m-methylstyrene, p-methylstyrene and p-tert-butylstyrene; itaconic esters such as benzyl itaconate; maleic esters such as dimethyl maleate; fumaric esters such as dimethyl fumarate; and besides acrylonitrile, methacrylonitrile and vinyl acetate. These monomers may be used either singly or in any combination thereof.

The anionic component which reacts with the polyvalent metal is obtained by using a monomer having an anionic group as a copolymerizable component.

Examples of the monomer having the anionic group include monomers having a carboxylic group, such as acrylic acid, methacrylic acid, crotonic acid, ethacrylic acid, propylacrylic acid, isopropylacrylic acid, itaconic acid and fumaric acid and salts thereof; monomers having a sulfonic group, such as styrenesulfonic acid, sulfonic acid-2-propylacrylamide, acrylic acid-2-ethyl sulfonate, methacrylic acid-2-ethyl sulfonate and butylacrylamido-sulfonic acid and salts thereof; and monomers having a phosphonic group, such as methacrylic acid-2-ethyl phosphonate and acrylic acid-2-ethyl phosphonate. Among these, acrylic acid and methacrylic acid are particularly preferably used. These monomers may be used either singly or in any combination thereof.

The acid value of the anionic polymer is preferably within a range of from 100 to 400. If the acid value is lower than 100, in some cases, the polymer may not be dissolved in an aqueous medium, or the dispersion stability of the pigment dispersion dispersed with the polymer may become poor to cause aggregates. If the acid value exceeds 400 on the other hand, the dispersion stability of the pigment dispersion dispersed with the polymer having such acid value is increased, so that the reactivity with the polyvalent metal may be lowered, the pigment dispersion may permeate more deeply into the recording medium to lower an image density in some cases.

The weight average molecular weight of the anionic polymer dispersant is preferably within a range of from 2,000 to 50,000. If the weight average molecular weight is lower than 2,000, the formation of a film by such a polymer becomes insufficient, so that the abrasion resistance may become insufficient in some cases. If the weight average molecular weight exceeds 50,000 on the other hand, the viscosity of the resulting ink is increased, so that ejection may become unstable in some cases when it is intended to conduct printing with such an ink by an ink-jet system.

The anionic polymer dispersant is preferably a copolymer of at least one selected from a monomer of the formula (2) and a monomer of the formula (3) in addition to the (meth)acrylic ester having a polyethylene glycol substituent represented by the formula (1) and the radically polymerizable monomer. Examples of the monomer of the formula (2) include styrene, α-methylstyrene, o-methylstyrene, m-methylstyrene, p-methylstyrene and p-tert-butylstyrene. Examples of the monomer of the formula (3) include 2-ethylhexyl (meth)acrylate, n-hexyl (meth)acrylate, c-hexyl (meth)acrylate, n-octyl (meth)acrylate and benzyl (meth)acrylate.

A polymer dispersion containing the above-described monomers as structural units is preferred because the dispersibility of the pigment is improved, and the dispersion stability of the resulting pigment dispersion to external stimuli such as heat or that with time becomes excellent. Among these, the use of styrene is more preferred because the dispersion stability of the resulting pigment dispersion with time becomes excellent, and ejection stability when printing by an ink-jet system is conducted becomes stable.

As the content of at least one selected from the monomer of the formula (2) and the monomer of the formula (3), a range of from 20 mass % to 80 mass % is preferably used. If the content is lower than 20 mass % or exceeds 80 mass %, the sufficient dispersion stability of the resulting pigment dispersion or the sufficient ejection stability when it is used in an ink-jet ink may not be achieved in some cases.

The polymer dispersant is preferably used in a range of from 20 to 200 parts (by mass) per 100 parts of the pigment. If the amount of the dispersant used is less than 20 parts, the film-forming ability by the polymer becomes insufficient, and so the abrasion resistance of the resulting print becomes insufficient. If the amount exceeds 200 parts on the other hand, the amount of the polyvalent metal required for causing a sufficient aggregating reaction of the resulting pigment dispersion with the polyvalent metal is increased, and the viscosity of the resulting ink is increased with the increase of the dispersant, so that ejection may become unstable in some cases when it is intended to use the ink in printing by the ink-jet system.

(B) Case where Two Polymer Dispersants are Used:

An anionic polymer for causing a strong aggregating reaction with a polyvalent metal and an anionic polymer for controlling the aggregating reaction are used in combination as two anionic polymers contained in the aqueous ink, whereby the permeability of a colorant contained in the aqueous ink into a recording medium can be controlled.

It is only necessary that the pigment dispersion contained in the aqueous ink is dispersed by at least the anionic polymer for causing the strong aggregating reaction with the polyvalent metal. However, both of the two polymers may be used as dispersants. As the two polymer dispersants, may preferably be used polymers or copolymers of a monomer component having a radically polymerizable unsaturated bond, such as acrylic resins or styrene/acrylic resins from the viewpoints of being generally usable and simply conducting functional design of the dispersants.

Polymer (I) is a copolymer of a radically polymerizable monomer such as at least one selected from a monomer of the formula (4) and a monomer of the formula (5) with an anionic radically polymerizable monomer, wherein the content of the at least one selected from the monomer of the formula (4) and the monomer of the formula (5), which are structural units, ranges from 50 mass % to 80 mass %. Since the above-described polymer contains a monomer having high hydrophobicity, a hydrophobic interaction acts with the reaction of the polyvalent metal with an anionic group by dispersing the pigment by at least Polymer (I), so that sufficient aggregation reactivity between a polyvalent metal salt and the pigment dispersion is imparted. The dispersion stability of the pigment dispersion with time is also improved.

It goes without saying that Polymer (II) may contribute to the dispersion of the pigment together with Polymer (I) in the pigment dispersion in the ink. If the content of the structural unit composed of at least one selected from the monomer of the formula (4) and the monomer of the formula (5), which are structural units, is lower than 50 mass % or exceeds 80 mass %, sufficient dispersion stability of the pigment dispersion is not achieved, so that the sufficient ejection stability may not be achieved in some cases when the dispersion is used in an ink-jet ink.

Examples of the monomer of the formula (4), which is a structural unit of the anionic polymer, include styrene monomers such as styrene, α-methylstyrene, o-methylstyrene, m-methylstyrene, p-methylstyrene and p-tert-butylstyrene. Examples of the monomer of the formula (5) include (meth) acrylic esters such as butyl (meth)acrylate, benzyl (meth) acrylate, 2-ethylhexyl (meth)acrylate and n-hexyl (meth) acrylate. Among these, styrene is preferably used. The use of styrene as the monomer of the formula (4) is preferred because not only the dispersion stability of the resulting pigment dispersion with time is improved, but also ejection stability is improved when printing is conducted with the resulting ink by an ink-jet system.

Examples of the anionic radically polymerizable monomer include monomers having a carboxylic group, such as acrylic acid, methacrylic acid, crotonic acid, ethacrylic acid, propylacrylic acid, isopropylacrylic acid, itaconic acid and fumaric acid and salts thereof; monomers having a sulfonic group, such as styrenesulfonic acid, sulfonic acid-2-propylacrylamide, acrylic acid-2-ethyl sulfonate, methacrylic acid-2-ethyl sulfonate and butylacrylamido-sulfonic acid and salts thereof; and monomers having a phosphonic group, such as methacrylic acid-2-ethyl phosphonate and acrylic acid-2-ethyl phosphonate. Among these, acrylic acid and methacrylic acid are particularly preferably used. At least one of these monomers may be used.

Polymer (II) is a copolymer of a radically polymerizable monomer represented by the formula (6) with an anionic radically polymerizable monomer, wherein the content of the monomer of the formula (6), which is a structural unit, ranges from 20 mass % to 80 mass %. If the content of the monomer of the formula (6) exceeds 80 mass %, in some cases, the solubility of the copolymer in an aqueous medium may be lowered, or the dispersion stability of the pigment dispersion in the resulting ink may be lowered. If the content is lower than 20% on the other hand, the reactivity between the reaction liquid and the resulting ink may not be controlled in some cases. Examples of the monomer of the formula (6) include propyl (meth)acrylate, ethyl (meth) acrylate and methyl (meth)acrylate. As the anionic radically polymerizable monomer, may be used the same monomer as that mentioned in Polymer (I).

As another preferred embodiment, Polymer (II) preferably contains a monomer having a nonionic substituent group as a structural unit. Polymer (II) contains the monomer having the nonionic substituent group, whereby abrasion resistance of the resulting print is improved as described above. Further, Polymer (II) is preferably a copolymer composed of at least a radically polymerizable monomer represented by the formula (7) and an anionic radically polymerizable monomer, wherein the content of the monomer of the formula (7), which is a structural unit, ranges from 5 mass % to 50 mass %.

If the content of the structural unit composed of the monomer of the formula (7) is lower than 5 mass %, the effect of controlling the reactivity between the polyvalent metal and the pigment dispersion in the resulting aqueous ink may become insufficient in some cases. If the content exceeds 50 mass % on the other hand, the dispersion stability of the pigment dispersion is increased, so that the reactivity with the polyvalent metal may be lowered in some cases. As the anionic radically polymerizable monomer, may be used at least one of the monomers mentioned in the description of Polymer (I).

The weight average molecular weights of Polymers (I) and (II) are preferably within a range of from 2,000 to 50,000. If the weight average molecular weight is lower than 2,000, the formation of a film by such a polymer becomes insufficient, so that the abrasion resistance may become insufficient in some cases. If the weight average molecular weight exceeds 50,000 on the other hand, the viscosity of the resulting ink is increased, so that ejection may become unstable in some cases when it is intended to conduct printing with such an ink by an ink-jet system.

Polymer (I) and Polymer (II) are preferably used in a range of from 20 parts by mass to 200 parts by mass in total per 100 parts by mass of the pigment. If the amount used is less than 20 parts by mass, the formation of a film by such polymers becomes insufficient, so that the abrasion resistance may become insufficient in some cases. If the amount exceeds 200 parts by mass on the other hand, the amount of the polyvalent metal required for causing a sufficient aggregating reaction of the resulting pigment dispersion with the polyvalent metal is increased, and the viscosity of the resulting ink is increased with the increase of the dispersant, so that ejection may become unstable in some cases when it is intended to use the ink in printing by the ink-jet system.

A proportion of Polymer (II) to Polymer (I) is preferably from 10 parts by mass to 300 parts by mass per 100 parts by mass of Polymer (I). If the proportion of Polymer (II) is lower than 10 parts by mass per 100 parts by mass of Polymer (I), the aggregating reaction with the polyvalent metal is liable to take place, so that the pigment dispersion tends to be present in the vicinity of the surface of a recording medium, and the abrasion resistance of the resulting print tends to be lowered. If the proportion exceeds 300 parts by mass on the other hand, the aggregating reaction with the polyvalent metal is hard to take place, so that the pigment dispersion may deeply permeate into a recording medium in some cases to lower the image density of the resulting print.

Pigment

Examples of pigments usable in the aqueous inks according to the present invention include carbon black and organic pigments. One of the various pigments or a combination of two or more thereof may be used.

Carbon Black

Specific examples of carbon black include carbon black pigments such as furnace black, lamp black, acetylene black and channel black. Examples of carbon black pigments usable include Raven 7000, Raven 5750, Raven 5250, Raven 5000, Raven 3500, Raven 2000, Raven 1500, Raven 1250, Raven 1200, Raven 1190 ULTRA-II, Raven 1170 and Raven 1255 (all, products of Columbian Carbon Co.) Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (all, products of Cabot Co.), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (all, products of Degussa AG), and No. 25, No. 33, No. 40, No. 47, No. 52, No. 900, No. 2300, MCF-88, MA600, MA7, MA8 and MA100 (all, products of MITSUBISHI CHEMICAL CORPORATION). However, the present invention is not limited thereto, and any carbon black conventionally known may be used. Magnetic fine particles such as magnetite and ferrite, titanium black, and the like may also be used as black pigments.

Organic Pigment

Specific examples of the organic pigments include insoluble azo pigments such as Toluidine Red, Toluidine Maroon, Hansa Yellow, Benzidine Yellow and Pyrazolone Red, soluble azo pigments such as Lithol Red, Helio Bordeaux, Pigment Scarlet and Permanent Red 2B, derivatives from vat dyes such as alizarin, indanthron and Thioindigo Maroon, phthalocyanine pigments such as Phthalocyanine Blue and Phthalocyanine Green, quinacridone pigments such as Quinacridone Red and Quinacridone Magenta, perylene pigments such as Perylene Red and Perylene Scarlet, isoindolinone pigments such as Isoindolinone Yellow and Isoindolinone Orange, imidazolone pigments such as Benzimidazolone Yellow, Benzimidazolone Orange and Benzimidazolone Red, pyranthrone pigments such as Pyranthrone Red and Pyranthrone Orange, thioindigo pigments, condensed azo pigments, thioindigo pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red, Dioxazine Violet, etc.

When organic pigments are indicated by COLOR INDEX (C.I.) numbers, the following pigments may be exemplified. It goes without saying that conventionally known organic pigments may also be used in addition to the following pigments.

C.I. Pigment Yellow 12, 13, 14, 17, 20, 24, 74, 83, 86, 93, 109, 110, 117, 120, 125, 128, 137, 138, 147, 148 151, 153, 154, 166 and 168;

C.I. Pigment Orange 16, 36, 43, 51, 55, 59 and 61;

C.I. Pigment Red 9, 48, 49, 52, 53, 57, 97, 122, 123, 149, 168, 175, 176, 177, 180, 192, 215, 216, 217, 220, 223, 224, 226, 227, 228, 238 and 240;

C.I. Pigment Violet 19, 23, 29, 30, 37, 40 and 50;

C.I. Pigment Blue 15, 15:1, 15:3, 15:4, 15:6, 22, 60 and 64;

C.I. Pigment Green 7 and 36; and

C.I. Pigment Brown 23, 25 and 26.

In the present invention, the amount of the pigment added into the ink is preferably within a range of from 0.1 mass % to 15 mass %, particularly from 1 mass % to 10 mass % based on the total amount of the ink. When the amount of the pigment falls within this range, the resulting pigment dispersion contained in the ink can retain the stably dispersed state. Further, a dye may be added as a colorant in addition to the pigment dispersion for purposes of, for example, adjusting the color tone of the resulting ink.

Aqueous Medium

No particular limitation is imposed on an aqueous medium dissolving or dispersing the above-described pigment therein so far as it may be used for inks. When the resulting ink is applied to a recording medium by an ink-jet method (for example, Bubble-Jet method), the ink may preferably be prepared so as to have desired viscosity and surface tension for the purpose of achieving excellent ink-jet ejection properties.

Examples of the aqueous medium used in the inks according to the present invention include water and mixed solvents of water and a water-soluble organic solvent. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. The above-described water-soluble organic solvents may be used either singly or in any combination thereof. As the water, may preferably be used deionized water (ion-exchanged water).

No particular limitation is imposed on the content of the water-soluble organic solvent contained in the ink used in the present invention. However, it is preferably within a range of from 3 mass % to 50 mass % based on the total amount of the ink. The content of water in the ink is preferably within a range of from 50 mass % to 95 mass % based on the total amount of the ink.

Other Components

Besides the above components, a surfactant, an antifoaming agent, an antiseptic, a mildewproofing agent and the like, to say nothing of a humectant, may be added to the aqueous inks according to the present invention, as needed, so as to obtain inks having desired physical property values.

Component of Reaction Liquid

Polyvalent Metal Ion and Salt Thereof

Specific examples of polyvalent metal ions usable in the reaction liquid include divalent metal ions such as $Ca^{2+}$, $Cu^{2+}$, $Ni^{2+}$, $Mg^{2+}$, $Zn^{2+}$ and $Ba^{2+}$, and trivalent metal ions such as $Al^{3+}$, $Fe^{3+}$, $Cr^{3+}$ and $Y^{3+}$. The salt of the polyvalent metal ion means a metal salt composed of such a polyvalent metal ion as mentioned above and an anion bonded to the polyvalent metal ion and is required to be soluble in water. Examples of the anion for forming the salt include $SO_4^{2-}$, $Cl^-$, $CO_3^{2-}$, $NO_3^-$, $I^-$, $Br^-ClO^{3-}$, $CH_3COO^-$ and $HCOO^-$. It goes without saying that the present invention is not limited to these compounds.

Taking the effect of the present invention into consideration, the content of the polyvalent metal ion in the reaction liquid is preferably from 0.01 mass % to 10 mass %, more preferably from 1.0 mass % to 5 mass % based on the total amount of the reaction liquid. In order to sufficiently exhibit a function of destabilizing the ink and achieve high-level image uniformity and optical density, the polyvalent metal ion is preferably contained in a range of from 2.0 mass % to 4.0 mass % based on the reaction liquid. Although the polyvalent metal ion may be contained in an amount exceeding 10 mass % in the reaction liquid, it may not be generally contained in excess for such reasons that marked increase in the function of destabilizing the ink is not desired even when the polyvalent metal ion is contained in an amount more than 10 mass %.

The reaction liquid preferably contains no colorant and is transparent, but it is not always required not to exhibit absorption in a visible region. In other words, it may exhibit absorption in the visible region so far as the resulting image is substantially not affected.

Aqueous Medium

Examples of an aqueous medium used in the reaction liquid include water and mixed solvents of water and a water-soluble organic solvent. The water-soluble organic solvent particularly preferably has an effect of preventing the drying of the resulting reaction liquid. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. The above-described water-soluble organic solvents may be used either singly or in any combination thereof. As the water, may preferably be used deionized water (ion-exchanged water).

No particular limitation is imposed on the content of the water-soluble organic solvents contained in the reaction liquid used in the present invention. However, it is preferably within a range of from 3 mass % to 50 mass % based on the total amounts of the reaction liquid. The content of water contained in the reaction liquid is preferably within a range of from 50 mass % to 95 mass % based on the total amount of the reaction liquid.

Other Components

Besides the above components, a polymeric compound, a surfactant, an antifoaming agent, an antiseptic, a mildew-proofing agent and the like may be suitably added to the reaction liquid according to the present invention, as needed, to obtain a reaction liquid having desired physical property values.

Polymer Compound

A polymer compound may be further contained in the reaction liquid according to the present invention. By such a constitution, the abrasion resistance of the resulting recorded article can be improved. The polymer compound used in the reaction liquid according to the present invention is preferably a nonionic water-soluble polymer that does not directly participate in the reaction of a component such as the colorant in the aqueous ink and the polyvalent metal ion or the like in the reaction liquid. Specific examples thereof include resins such as polyacrylamide, polyvinyl pyrrolidone, water-soluble celluloses such as carboxymethyl cellulose, hydroxymethyl cellulose and hydroxypropyl cellulose, polyvinyl methyl ether, polyvinyl acetal, and polyvinyl alcohol. However, the present invention is not limited thereto. For example, a polymer compound with an anionic unit or cationic unit added to any of these nonionic polymers might also be used so far as the respective basic performance of the aqueous ink and reaction liquid can be retained. Further, the polymer compound is perfectly soluble in water. However, it may also be a dispersion such as a latex or emulsion. The content of the polymer compound added is preferably within a range of from 0.01 mass % to 20 mass % based on the total amount of the reaction liquid.

Physical Properties

In the present invention, the pH of the reaction liquid is preferably lower than the pH of the ink from the viewpoints of, for example, more effectively causing the reaction of the ink with the reaction liquid, and improving uniformity and strike-through property of the resulting print.

Set of Reaction Liquid and Aqueous Ink

No particular limitation is imposed on the color of an ink when composing a set of a reaction liquid and an aqueous ink according to the present invention, which is composed of a combination of the aqueous ink and reaction liquid described above, so that any aqueous ink exhibiting one color tone selected from, for example, yellow, magenta, cyan, red, green, blue and black can be employed. Specifically, a colorant or colorants may be suitably chosen for use from among the colorants described above so as to provide an aqueous ink having desired color tone. The ink combined with the reaction liquid is not limited to one kind of ink, and a more preferred embodiment is a set of a reaction liquid and aqueous inks, in which two or more inks different in color from each other are combined so as to be suitable for use in the formation of a multi-color image. Incidentally, in this case, it is only necessary that at least one aqueous ink among the two or more aqueous inks reacts with the reaction liquid.

More specifically, it is only necessary that at least one of the inks which compose the set of the reaction liquid and the aqueous inks is an aqueous ink containing the pigment dispersion, in which the pigment has been dispersed with the anionic polymer dispersant, and forming colorant aggregates when it comes into contact with the reaction liquid on a recording medium. It goes without saying that all the aqueous inks which compose the set of the reaction liquid and the aqueous inks may be aqueous inks having the above-described function. The set of the reaction liquid and the aqueous inks having such constitution can prevent bleeding caused when aqueous inks of different colors are applied adjoiningly to a recording medium, which is a problem in the case where a multi-color image is formed by an ink-jet apparatus.

More specifically, the bleeding that becomes a problem in an ink-jet multi-color image particularly markedly occurs between a black ink and another color ink (for example, at least one ink selected from yellow ink, magenta ink, cyan ink, red ink, green ink and blue ink). Accordingly, in the present invention, it is particularly preferred to prepare at least a black ink as an ink that interacts with the reaction liquid.

Image Forming Method

The image forming method according to the present invention comprises the steps of (i) applying the aqueous ink which composes the above-described set of the reaction liquid and the aqueous ink to a recording medium by an ink-jet recording method; and (ii) applying the reaction liquid which composes the above-described set of the reaction liquid and the aqueous ink to the recording medium, wherein the step (i) and the step (ii) are conducted so as to bring the aqueous ink into contact with the reaction liquid on the recording medium. When the aqueous ink comes into contact with the reaction liquid on the recording medium according to such a process, a high-quality image having high image density and high color development, improved in unclearness at a contour portion of the image, free from occurrence of color bleed and having excellent strike-through property can be formed. The term "strike-through property" as used herein means exudation of a colorant to a backside surface from a printing surface, which is caused by excessive permeation of ink. When the reaction liquid and the aqueous ink are applied to the recording medium, it is accordingly preferable to apply the reaction liquid to at least a region of the recording medium to which the aqueous ink is applied. It is more preferable to apply the reaction liquid to a region wider than the region of the recording medium to which the aqueous ink is applied.

In the present invention, a plurality of sets of the reaction liquid and aqueous ink comprising an aqueous ink of the constitution according to the present invention, or the set of the reaction liquid and aqueous ink comprising an aqueous ink of this constitution and aqueous inks of another constitution are combined, whereby sets of the reaction liquid and aqueous ink comprising an aqueous ink that can be suitably used in formation of high-quality color images in any event are provided. When such a set of the reaction liquid and aqueous ink comprising such an aqueous ink is used to conduct recording using the set of the reaction liquid and aqueous ink comprising the aqueous ink of the constitution according to the present invention as, for example, a black ink in such a manner that a black image area is adjacent to a color image area, occurrence of bleeding can be extremely effectively prevented.

The present inventors have found in the course of various investigations as to a system for forming images with two liquids that the following conditions are important for the purpose of obtaining a high-quality image and at the same time providing a print also having good abrasion resistance. Namely, it is extremely important to form aggregates by bringing a pigment into contact with a polyvalent metal on a recording medium in such a manner that the aggregates are present at a fixed region within the recording medium and specifically formed in a greater amount at a position somewhat inside the recording medium in the depth direction from the surface-layer portion thereof, i.e., within 30 µm in the depth direction from the surface thereof. In order to control the position of the aggregates present in the recording medium, it is further a very important factor to control the reactivity between the pigment and the polyvalent metal to such a specified value as proposed in the present invention. Further, the position, amount and the like of the polyvalent metal present in the recording medium are controlled, whereby the position of the aggregates can easily be controlled.

In the system for forming images with 2 liquids, there are various methods as means for bringing the reaction liquid into contact with the ink. Examples thereof include a method of bringing both reaction liquid and ink into contact with each other in a liquid state on a recording medium, and a method of bringing the reaction liquid into contact with the ink after the fixation of the reaction liquid to the recording medium is completed, namely, droplets of the reaction liquid are absorbed in the interior of the recording medium.

The present inventors have come to the conclusion that the method of bringing both aqueous ink and reaction liquid into contact with each other in a liquid state on the recording medium is most preferable in order to distribute aggregates in a certain depth from the surface-layer portion of the recording medium without localizing them on the surface of the recording medium. Specifically, a method of applying the aqueous ink after the fixation of the reaction liquid is completed is superior to a method of applying the aqueous ink and the reaction liquid to the recording medium at almost the same time by an ink-jet recording method.

The reason why the method of applying the aqueous ink after the fixation of the reaction liquid to the recording medium is completed brings about excellent abrasive resistance is considered to be as follows. When the reaction liquid and the aqueous ink are brought into contact with each other in the liquid state on the recording medium, the colorant aggregates at the surface-layer portion of the recording medium as the reactivity between the ink and the reaction liquid becomes stronger. As a result, an image far excellent in coloring ability is provided. However, sufficient fastness properties for image may not be achieved in some cases. When the ink is applied after the fixation of the reaction liquid to the recording medium is completed, on the other hand, many of a reactive component contained in the reaction liquid present in the interior of the recording medium, many colorant aggregates are formed at a position somewhat inside the recording medium in the depth direction from the surface-layer portion thereof. As a result, it is considered that the abrasion resistance becomes superior to the case where the 2 liquids come into contact with each other in the liquid state on the recording medium.

From the above-described reason, in order to control the position of the aggregates, it is more preferable to devise a means for applying the reaction liquid to the recording medium in addition to the control of the reactivity between the pigment and the polyvalent metal.

Incidentally, the term "the point of time the fixation has been completed" in the present invention means the point of time a value of $Ka(t-tw)^{1/2}$ in the following equation (a) has become greater than the amount of the reaction liquid actually applied to the surface of paper. This means the point of time droplets of the reaction liquid have been absorbed in the interior of the recording medium and means after t seconds calculated from the Ka value according to the Bristow's method and the amount of the liquid composition applied.

Incidentally, the Ka value in the present invention is found by the Bristow's method as a measure indicating the permeability of an ink into a recording medium. In other words, when the permeability of the ink is indicated by the amount V of the ink per $m^2$ of the recording medium, the amount V $(mL/m^2=\mu m)$ of the ink permeated into the recording medium after the prescribed time t (m sec) has elapsed from the ejection of an ink droplet is represented by the following Bristow's equation $$V=Vr+Ka(t-tw)^{1/2} \quad \text{Equation (a)}.$$

Here, just after the reaction liquid has been applied to recording medium, most of the reaction liquid is absorbed at irregular portions (rough surface portions of the recording medium), so that the reaction liquid scarcely permeates into the interior of the recording medium. The time during this process is a contact time (tw), and the amount of the reaction liquid absorbed in the irregular portions for the contact time is Vr. When the time goes on over the contact time after the reaction liquid is applied to the recording medium, the amount of the reaction liquid permeated into the recording medium increases by an amount proportional to the ½ power of the time over the contact time, i.e., (t−tw). Ka is a proportional coefficient of this increment and indicates a value according to the permeation rate. The Ka value may be measured by means of a dynamic permeability tester for liquid (for example, trade name: Dynamic Permeability Tester S; manufactured by Toyo Seiki Seisaku-Sho, Ltd.) according to the Bristow's method, or the like.

The Ka value according to the Bristow's method in the present invention is a value measured by using, as a recording medium, plain paper [for example, PB paper used for copying machines using an electrophotographic system, page printers (laser beam printers) or printers using an ink-jet recording system, or paper for PPC that is paper used for copying machines using the electrophotographic system; product of Canon Inc.]. As the measuring environment, is assumed an ordinary office environment, for example, a temperature of 20 to 25° C. and a humidity of 40 to 60%.

According to the results of the investigation by the present inventors, in order to more exactly control the position of the aggregates, it is important that a greater amount of the polyvalent metal be present within about 30 μm from the surface of the recording medium. In order for a greater amount of the polyvalent metal to present within about 30 μm from the surface of the recording medium, it is considered that the permeability and amount of the reaction liquid applied to the recording medium greatly participate, to say nothing of the amount of the polyvalent metal contained in the reaction liquid.

The reaction liquid permeates along fibers of the recording medium under the influence of a solvent, a surfactant or the like at the same time it comes into contact with the recording medium, and the liquid permeated simultaneously starts evaporating, so that it is considered that a part of the polyvalent metal, from which dissolving power has been lost, starts depositing. In order for a great amount of the polyvalent metal to present at a position somewhat inside the recording medium in the depth direction from the surface-layer portion of the recording medium, it is important to apply a reaction liquid having a certain permeation rate to the recording medium as little as possible.

From the above fact, with respect to the permeability of the reaction liquid into plain paper in the present invention, the Ka value found according to the Bristow's method is preferably at least 1.3 mL·m$^{-2}$·msec$^{-1/2}$, more preferably more than 3.0 mL·m$^{-2}$·msec$^{-1/2}$, and the amount of the reaction liquid applied is preferably from 0.5 g/m$^2$ to 5 g/m$^2$, more preferably from 2.0 g/m$^2$ to 3.0 g/m$^2$.

The point of the present invention is to distribute aggregates formed by bringing the reaction liquid into contact with the aqueous ink in a certain depth from the surface-layer portion of the recording medium without localizing them on the surface of the recording medium. In order to attain such a state, it is most important to control the reactivity between the reaction liquid and the aqueous ink to the value specified in the present invention, and the present invention can be more effectively realized by controlling the amount and permeability rate of the reaction liquid applied, the time from the application of the reaction liquid to the recording medium to the application of the ink, and the like. Regarding the conventional systems that the reaction liquid and aqueous ink are used to form an image, not only the reactivity is stronger than the reactivity between the reaction liquid and aqueous ink according to the present invention, but also there is no system that such control of the reactivity as described above is conducted. For example, in many of the conventional systems, a great amount of the reaction liquid is applied to the recording medium. In such a system, many of the aggregates are localized on the surface-layer portion of the recording medium when both reaction liquid and aqueous ink are brought into contact with each other in a liquid state on the recording medium. On the other hand, even when the aqueous ink is applied after the reaction liquid is fixed to some extent to the recording medium, the polyvalent metal does not stay in the interior of the recording medium, but diffuses in the vicinity of the backside surface because the amount of the reaction liquid applied is great. As a result, the strike-through property of the resulting print may be lowered in some cases.

Examples of the method for applying the reaction liquid according to the present invention to recording medium include a method of using an ink-jet recording system like the inks and a method of applying the reaction liquid according to the present invention to recording medium by a roller or the like. Among these, the application by the roller or the like is preferred because this method does not need to take ejection stability or the like into consideration. A specific application method will be described subsequently.

The amount of the reaction liquid applied when it is applied to the recording medium by a roller or the like can be suitably controlled by physical properties of the reaction liquid, rotational speed of a roller used in an applicator, contact pressure of the roller against the recording medium, and the like.

Ink Properties: Ink-Jet Ejection Properties and Permeability into Recording Medium The set of the reaction liquid and aqueous ink according to the present invention is particularly suitable for use in ink-jet recording. Ink-jet recording methods include a recording method in which mechanical energy is caused to act on an ink to eject droplets of the ink, and a recording method in which thermal energy is applied to an ink to eject droplets of the ink by bubbling of the ink. The inks and reaction liquids according to the present invention may also be used in these recording methods. In such a case, the reaction liquids and inks of the constitution according to the present invention are adjusted so as to have such properties that they can be ejected from an ink-jet head. From the viewpoint of ejection ability from an ink-jet head, these liquids preferably have, for example, a viscosity within a range of from 1 to 15 mPa·s, particularly from 1 to 5 mPa·s and a surface tension of 25 mN/m (dyn/cm) or more, particularly from 25 to 50 mN/m (dyn/cm).

In particular, the reaction liquid preferably has a surface tension of from 25 mN/m (dyn/cm) or more to 35 mN/m (dyn/cm) or less because it is preferable to apply the reaction liquid to at least a printing region of the recording medium to which the ink is applied.

When the reaction liquid is applied to the recording medium by a roller coating or bar coating system, the reaction liquid desirably has a surface tension of 20 mN/m (dyn/cm) or more, particularly from 25 mN/m (dyn/cm) or more to 35 mN/m (dyn/cm) or less and a viscosity of 100 cP or less, particularly from 5 cP or more to 60 cP or less from the viewpoints of the control of an amount applied and even application on the recording medium.

Ink-Jet Recording Apparatus

An exemplary recording apparatus for forming an image using the aqueous ink or/and the reaction liquid will hereinafter be described.

Figure 3:
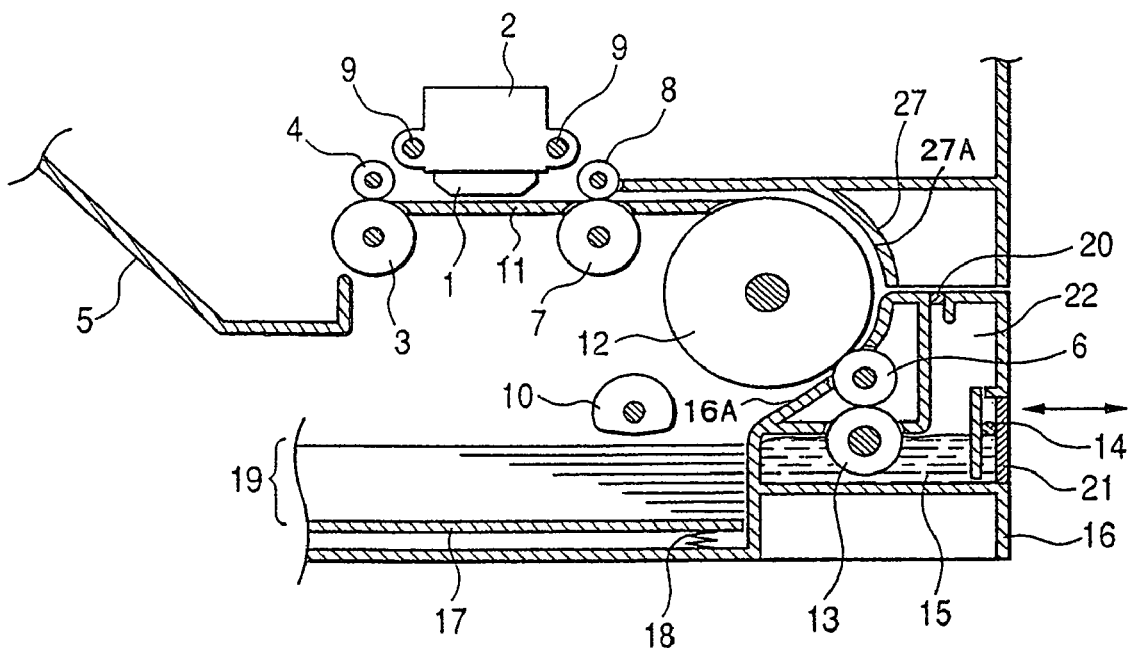
FIG. 3 is a schematic perspective view illustrating an exemplary ink-jet recording apparatus.

FIG. 3 illustrates an exemplary ink-jet recording apparatus. This image forming apparatus uses a serial type ink-jet recording system and comprises a recording head 1, a paper feed cassette 16, in which a paper feed tray 17 for feeding a recording medium (hereinafter also referred to as "recording paper") 19 and a means for applying the reaction liquid according to the present invention are integrally formed, a driving means for reciprocatingly moving the recording head in a direction perpendicular to a conveying direction of the recording paper, and a control means for controlling the drive of these components.

The recording head 1 is mounted on a carriage 2 in such a manner that a surface, on which ink-ejecting openings have been formed, is oriented on the side of a platen 11. The recording head 1 has the ink-ejecting openings, a plurality of electrothermal converters (for example, heating resistors) for heating an aqueous ink and a substrate supporting it though they are not illustrated. Incidentally, the recording head 1 is equipped with an ink cartridge at an upper part within carriage.

The carriage 2 mounts the recording head 1 and can be reciprocatingly moved along two guide rods 9 extending in parallel along a width direction of the recording paper 19. The recording head 1 is synchronistically driven with the reciprocating motion of this carriage to eject ink droplets to the recording paper 19, thereby forming an image. The paper feed cassette 16 can be detachably installed in the image forming apparatus body. The recording paper 19 is stacked on the paper feed tray 17 within the paper feed cassette 16 and contained therein. Upon feeding of the paper, a sheet located at the uppermost position is pressed against a feed roller 10 by a spring 18 pressing the paper feed tray 17 upward. The feed roller 10 is a roller having a sectional form of a substantially half-moon and driven and rotated by a motor (not illustrated) to feed only the sheet located at the uppermost position by a separation pick (not illustrated).

The recording paper 19 separated and fed is conveyed along a conveying surface 16A of the paper feed cassette 16 and a conveying surface 27A of a paper guide 27 by an intermediate roller 12 having a large diameter and a coating roller 6 having a small diameter and brought into contact under pressure with the intermediate roller 12. These conveying surfaces are composed of a curved surface so as to draw an arc concentric with the intermediate roller 12. Accordingly, the conveying direction of the recording paper 19 is reversed by being passed through these conveying surfaces 16A and 27A. In other words, the surface of the recording paper 19, on which printing is conducted, is turned downward until the paper is conveyed from the paper feed tray 17 and reaches the intermediate roller 12, but turned upward (on the side of the recording head) at the point of time it faces the recording head 1. Accordingly, the printing surface of the recording paper is always turned in a direction outside the image forming apparatus.

The means for applying the reaction liquid is provided within the paper feed cassette 16 and comprises a supply tank 22 for supplying the reaction liquid 15, an supply roller 13 rotatably supported in such a state that a part of its peripheral surface is immersed in the tank 22, and a coating roller 6 arranged in parallel with the supply roller and coming into contact with the supply roller 13 to be rotated in the same direction. The coating roller 6 is arranged in such a manner that its peripheral surface comes into contact with and parallels the intermediate roller 12 for conveying the recording paper 19. Accordingly, the intermediate roller 12 and coating roller 6 are rotated with the rotation of the intermediate roller 12 upon the conveyance of the recording paper 19. As a result, the reaction liquid 15 is supplied to the peripheral surface of the coating roller 6 by the supply roller 13, and further applied throughout to the printing surface of the recording paper 19 pinched between the coating roller 6 and the intermediate roller 12 by the coating roller 6.

In this image forming apparatus, a float 14 is provided within the supply tank 22. This float 14 is composed of a substance lighter than the specific gravity of the reaction liquid 15, so that the float floats on the level of the reaction liquid, whereby the remain of the reaction liquid can be visually confirmed from the outside through a remain-displaying window 21 that is a transparent member.

Figure 4:
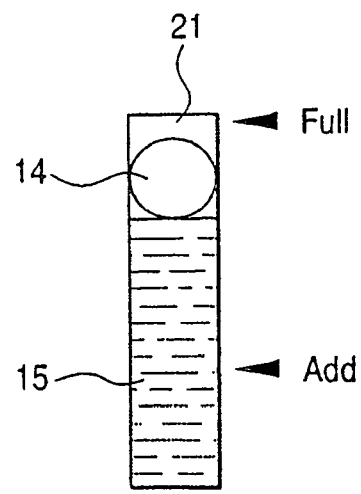
FIG. 4 is a sectional front elevation of a remaining liquid composition displaying part provided in the ink-jet recording apparatus shown in FIG. 3.

FIG. 4 illustrates a remain-displaying part viewed from the front. In the remain-displaying part, an indication indicating the degree of the remain is provided along a longitudinal direction of the remain-displaying window 21. The condition where the level of the reaction liquid or the float 15 reaches a position indicated by "Full" indicates a state that the reaction liquid has been fully supplied. On the other hand, the condition where the level of the reaction liquid or the float 15 is located at a position indicated by "Add" indicates that the reaction liquid is running short. Accordingly, it is quite obvious that it is only necessary to supply the reaction liquid when the reaction liquid 15 is gradually reduced, and the float 14 is lowered to the line of "Add".

Figure 5:
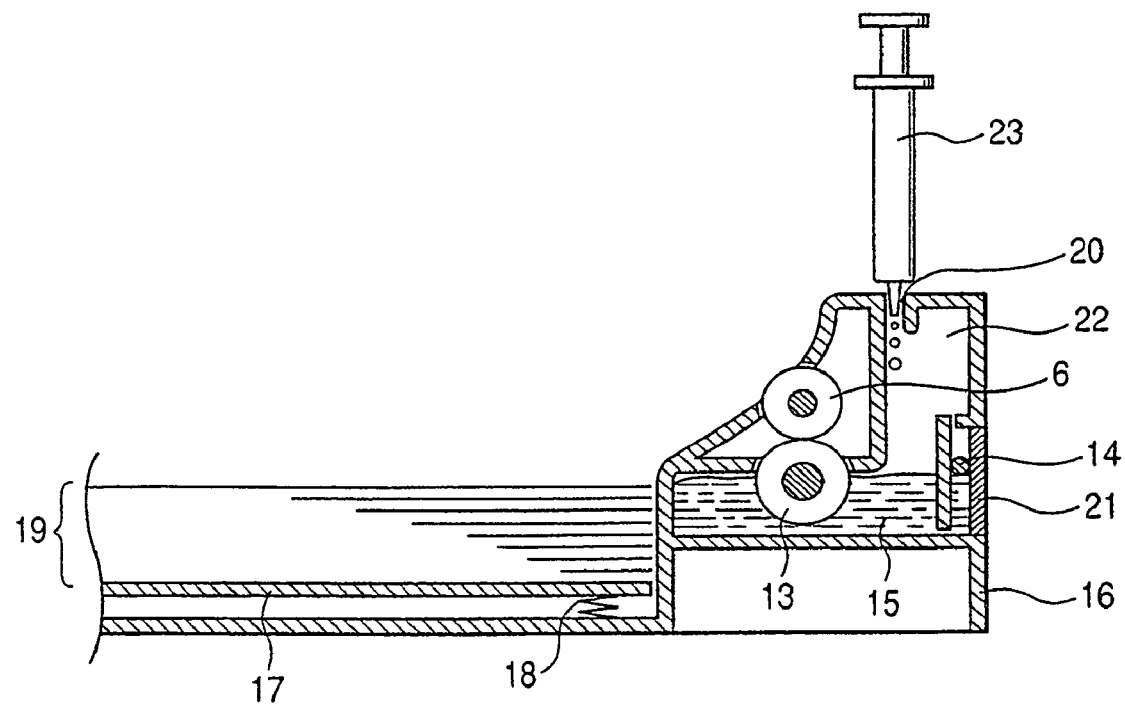
FIG. 5 is a schematic sectional side elevation illustrating a state that a liquid composition has been supplied to the ink-jet recording apparatus shown in FIG. 3.

With respect to a method for supplying the reaction liquid, as illustrated in FIG. 5, the tip of an injector 23 is inserted into an inlet port 20 formed by a rubber member having a slit, thereby injecting the reaction liquid in the supply tank 22.

The recording paper coated with the reaction liquid in this manner is then carried by a prescribed quantity by a main conveying roller 7 and a pinch roller 8 brought into contact under pressure with this roller to be conveyed to a recording part, thereby applying an ink from the recording head 1. The recorded sheet 19 subjected to paper feeding and printing in the constitution described above is discharged by a paper-discharging roller 3 and a spur 4 brought into contact under pressure with this roller and stacked on a paper discharge tray 5.

Recording Head

As embodiments of a recording head of an ejection system which causes a bubble to communicate with the air upon ejection, which can be suitably used in the present invention, are mentioned the so-called edge shooter type as described in, for example, Japanese Patent Registration No. 2783647 and the side shooter type effectively practiced in recent years.

In particular, the present invention has excellent effects in recording heads and recording apparatus of an ink-jet system that thermal energy is utilized to form droplets to be ejected, thereby conducting recording, among the ink-jet recording systems.

With respect to the typical construction and principle thereof, those using the basic principle disclosed in, for example, U.S. Pat. Nos. 4,723,129 and 4,740,696 are preferred. This system may be applied to any of the so-called On-Demand type and continuous type. In particular, the On-Demand type is effective because at least one driving signal, which corresponds to recording information and gives a rapid temperature rise exceeding film boiling, is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When this driving signal is applied in the form of a pulse, the growth-contraction of the bubble is suitably conducted in a moment, so that the ejection of the liquid (ink) excellent in responsiveness in particular can be achieved. It is thus more preferable to use such pulsed signals.

As the pulsed driving signal, such signals as described in U.S. Pat. Nos. 4,463,359 and 4,345,262 are suitable. When the conditions described in U.S. Pat. No. 4,313,124 that discloses an invention relating to the rate of temperature rise on the heat-acting surface are employed, far excellent recording can be conducted.

As the construction of the recording head, such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction that a heat-acting portion is arranged in a curved region may also be included in the present invention.

In addition, constructions based on Japanese Patent Application Laid-Open No. S59-123670 which discloses the construction that a slit common to a plurality of electrothermal converters is used as an ejection part of the electrothermal converters, and Japanese Patent Application Laid-Open No. S59-138461 which discloses the construction that an opening which absorbs a pressure wave of thermal energy is opposed to an ejection part may also be effective for the present invention.

Further, although a full-line type recording head having a length corresponding to the width of the greatest recording medium, on which recording can be conducted by the recording apparatus, may be any of the construction that the length is met by such a combination of plural recording heads as disclosed in the above-described publications and the construction as one recording head integrally formed, the present invention can more effectively exhibit the above-described effects.

In addition, the present invention is effective even when a replaceable, chip type recording head, in which electrical connection to an apparatus body and the feed of an ink from the apparatus body become feasible by installing in the apparatus body, or a cartridge type recording head, in which an ink tank is provided integrally with a recording head itself, is used.

Further, the addition of recovery means for a recording head, preliminary auxiliary means, etc. which are provided as constitution of the recording apparatus according to the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

The recording mode of the recording apparatus is not only a recording mode using only main colors such as black, but the present invention is also extremely effective for apparatus equipped with at least one of a complex color of different colors and a full color by color mixing though the recording head may be constructed integrally or by a combination of plural heads.

In the above-described embodiments of the present invention, the inks have been described as liquid. However, inks solidified at room temperature or lower may also be used so far as they are softened or liquefied at room temperature, or exhibit a liquid phase upon application of recording signals used because it is general in the above-described ink-jet systems that the temperature control of an ink itself is conducted within a range of from 30 to 70° C. to adjust the viscosity of the ink so as to fall within a stable ejection range.

In addition, inks that are liquefied by applying thermal energy according to recording signals and ejected as liquid inks, such as inks that temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those which begins to solidify at the point of time they reach a recording medium, may also be applied to the present invention. In such a case, the inks may be in a form that they are opposed to electrothermal converters in a state held as a liquid or solid in recesses or through-holes in a porous sheet as described in Japanese Patent Application Laid-Open No. S54-56847 or S60-61260. In the present invention, those that the above-described film boiling system is executed are most effective for the above-described inks.

Furthermore, as forms of the recording apparatus according to the present invention, may also be employed the forms of a copying machine combined with a reader and a facsimile having a transmitting-receiving function, in addition to the form that the apparatus is integrally or separately provided as an image output terminal for information processing instruments such as word processors and computers.

EXAMPLES

The present invention will hereinafter be described more specifically by the following Examples and Comparative Examples. However, the present invention is not limited at all by these examples so far as being within the gist of the present invention. Incidentally, all designations of "part" or "parts" and "%" as will be used in the following examples mean part or parts by mass and % by mass unless expressly noted. Although carbon black is used as a colorant in the following Examples, any colorant may be used so far as it belongs to the pigments described above.

Preparation of Reaction Liquid

The following components were mixed and thoroughly stirred into a solution. The resultant solution was then filtered under pressure through a microfilter (trade name: FR100, product of Fuji Photo Film Co., Ltd.) having a pore size of 1 μm, thereby preparing Reaction Liquid 1.

| | |
|---|---|
| Calcium nitrate (tetrahydrate) | 18 parts |
| Trimethylolpropane | 10 parts |
| Glycerol | 5 parts |
| Diethylene glycol | 5 parts |
| Acetylene glycol ethylene oxide adduct (trade name: Acetylenol EH, product of Kawaken Fine Chemicals Co., Ltd.) | 1 part |
| Ion-exchanged water | 61 parts. |

Preparation of Black Ink

Preparation of Pigment Dispersion

The following Pigment Dispersions 1 to 10 were first prepared.

Pigment Dispersion 1:

Ten parts of Monarch 880 (product of Cabot Co.) as a pigment, 40 parts of an anionic polymer P-1 [styrene/ M230G (product of Shin-Nakamura Chemical Co., Ltd.)/ acrylic acid terpolymer (copolymerization ratio (mass ratio)= 60/10/30), acid value: 180, weight average molecular weight: 9,000, an aqueous solution having a solid content of 10% (neutralizing agent: potassium hydroxide)) and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 1 having a solid content of about 14.0% and a weight average particle diameter of 110 nm as a final product.

Pigment Dispersion 2:

Ten parts of Monarch 880 (product of Cabot Co.) as a pigment, 40 parts of an anionic polymer P-2 [styrene/ M230G (product of Shin-Nakamura Chemical Co., Ltd.)/ acrylic acid terpolymer (copolymerization ratio (mass ratio)= 64/12/25), acid value: 154, weight average molecular weight: 7,500, an aqueous solution having a solid content of 10% (neutralizing agent: potassium hydroxide)] and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 2 having a solid content of about 14.0% and a weight average particle diameter of 110 nm as a final product.

Pigment Dispersion 3:

Ten parts of Monarch 880 (product of Cabot Co.) as a pigment, 40 parts of an anionic polymer P-3 [styrene/ M230G (product of Shin-Nakamura Chemical Co., Ltd.)/ acrylic acid terpolymer (copolymerization ratio (mass ratio)= 60/15/25), acid value: 160, weight average molecular weight: 11,000, an aqueous solution having a solid content of 10% (neutralizing agent: potassium hydroxide)] and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 3 having a solid content of about 14.0% and a weight average particle diameter of 102 nm as a final product.

Pigment Dispersion 4:

Ten parts of Monarch 880 (product of Cabot Co.) as a pigment, 40 parts of an anionic polymer P-4 (styrene/ M230G (product of Shin-Nakamura Chemical Co., Ltd.)/ acrylic acid terpolymer (copolymerization ratio (mass ratio)= 57/18/25), acid value: 155, weight average molecular weight: 6,900, an aqueous solution having a solid content of 10% (neutralizing agent: potassium hydroxide)] and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 4 having a solid content of about 14.0% and a weight average particle diameter of 106 nm as a final product.

Pigment Dispersion 5:

Ten parts of Monarch 880 (product of Cabot Co.) as a pigment, 20 parts of an anionic polymer P-5 [styrene/acrylic acid copolymer (copolymerization ratio (mass ratio)=70/ 30), acid value: 200, weight average molecular weight: 9,000, an aqueous solution having a solid content of 10%, neutralizing agent: potassium hydroxide) and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 10 hours while cooling with water. The thus-obtained dispersion was subjected to a centrifugal separator to remove coarse particles, thereby obtaining a pigment dispersion having a solid content of about 12% and a weight average particle diameter of 110 nm as a final product. To this dispersion, was added 20 parts of the anionic polymer P-3 (styrene/M230G (product of Shin-Nakamura Chemical Co., Ltd.)/acrylic acid terpolymer (copolymerization ratio (mass ratio)=60/15/25), acid value: 160, weight average molecular weight: 11,000, an aqueous solution having a solid content of 10% (neutralizing agent: potassium hydroxide)] to obtain Pigment Dispersion 5.

Pigment Dispersion 6:

Ten parts of Monarch 880 (product of Cabot Co.) as a pigment, 20 parts of the anionic polymer P-5 [styrene/ acrylic acid copolymer (copolymerization ratio (mass ratio)= 70/30), acid value: 200, weight average molecular weight: 9,000, an aqueous solution having a solid content of 10%, neutralizing agent: potassium hydroxide] and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 10 hours while cooling with water. The thus-obtained dispersion was subjected to a centrifugal separator to remove coarse particles, thereby obtaining a pigment dispersion having a solid content of about 12% and a weight average particle diameter of 110 nm as a final product. To this dispersion, was added 30 parts of an anionic polymer P-6 [ethyl acrylate/acrylic acid copolymer (copolymerization ratio (mass ratio)-87/13), acid value: 100, weight average molecular weight: 11,000, an aqueous solution having a solid content of 10% (neutralizing agent: potassium hydroxide)] to obtain Pigment Dispersion 6.

Pigment Dispersion 7:

Ten parts of Monarch 880 (product of Cabot Co.) as a pigment, 20 parts of an anionic polymer P-7 [styrene/butyl acrylate/acrylic acid terpolymer (copolymerization ratio (mass ratio)=40/35/25), acid value: 150, weight average molecular weight: 8,000, an aqueous solution having a solid content of 10%, neutralizing agent: potassium hydroxide] and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 7 having a solid content of about 12% and a weight average particle diameter of 115 nm as a final product.

Pigment Dispersion 8:

Ten parts of Monarch 880 (product of Cabot Co.) as a pigment, 25 parts of the anionic polymer P-5 [styrene/acrylic acid copolymer (copolymerization ratio (mass ratio)= 70/30), acid value: 200, weight average molecular weight: 10,000, an aqueous solution having a solid content of 10% (neutralizing agent: potassium hydroxide)] and 65 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 8 having a solid content of about 12.5% and a weight average particle diameter of 105 nm as a final product.

Pigment Dispersion 9:

Ten parts of Monarch 880 (product of Cabot Co.) as a pigment, 40 parts of the anionic polymer P-5 [styrene/acrylic acid copolymer (copolymerization ratio (mass ratio)= 70/30), acid value: 200, weight average molecular weight: 10,000, an aqueous solution having a solid content of 10%, neutralizing agent: potassium hydroxide] and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 9 having a solid content of about 14% and a weight average particle diameter of 101 nm as a final product.

Pigment Dispersion 10:

Ten parts of Monarch 880 (product of Cabot Co.) as a pigment, 40 parts of an anionic polymer P-8 [butyl acrylate/acrylic acid copolymer (copolymerization ratio (mass ratio)= 70/30), acid value: 200, weight average molecular weight: 9,800, an aqueous solution having a solid content of 10%, neutralizing agent: potassium hydroxide] and 50 parts of pure water were mixed. A batch type vertical sand mill (manufactured by AIMEX Co.) was charged with the resultant mixture and 250 parts of zirconia beads having a diameter of 0.3 mm to conduct a dispersing treatment for 10 hours while cooling with water. The thus-obtained dispersion was subjected to a centrifugal separator to remove coarse particles, thereby obtaining Pigment Dispersion 10 having a solid content of about 12.5% and a weight average particle diameter of 100 nm as a final product.

Preparation of Ink

The thus-obtained Pigment Dispersions 1 to 10 were respectively used to prepare Inks 1 to 10. The following respective components were mixed and thoroughly stirred into solutions or dispersions. The resultant solutions or dispersions were then filtered under pressure (pressurization conditions: 0.4 MPa) through a microfilter (trade name: FM300, product of Fuji Photo Film Co., Ltd.) having a pore size of 3.0 μm, thereby preparing Inks 1 to 10. Incidentally, Pigment Dispersions 1 to 10 were used for the preparation of Inks 1 to 10, respectively.

| | |
|---|---|
| Pigment Dispersion | 40 parts |
| Glycerol | 9 parts |
| Diethylene glycol | 6 parts |
| Acetylene glycol ethylene oxide adduct (trade name: Acetylenol EH, product of Kawaken Fine Chemicals Co., Ltd.) | 1 part |
| Ion-exchanged water | 44 parts. |

Evaluation of Set of Reaction Liquid and Ink

Inks and reaction liquids were combined with each other in accordance with the following Table 1 to prepare sets of a reaction liquid and an ink according to examples 1 to 7 and comparative examples 1 to 3, thereby forming images. As recording media, were used commercially available paper for copying, bond paper and recycled paper. The reaction liquid was first applied to each recording medium by a roller coating method using a coating roller of the construction illustrated in FIG. 3. The speed of the roller and the contact pressure between the roller and the recording medium were adjusted in such a manner that the amount of the reaction liquid applied to the recording medium was 2.4 g/cm². Just after the reaction liquid was fixed to the recording medium, its corresponding ink of Inks 1 to 10 was applied to the recording medium by means of an ink-jet recording apparatus, BJS700 (manufactured by Canon Inc.) having an On-Demand type multi-recording head that an ink is ejected by applying thermal energy to the ink according to recording signals, thereby conducting the following evaluation.

(1) Reactivity Between Ink and Reaction Liquid:

The ink and reaction liquid which compose each of the sets of a reaction liquid and an ink according to examples 1 to 7 and comparative examples 1 to 3 were mixed under the following condition to measure an absorbance of the mixture, thereby evaluating the set as to reactivity. The results are shown in Table 1.

Taking as (A) an absorbance at a maximum absorption wavelength in a visible region after 50 g of a 800-times diluted aqueous solution of the reaction liquid and 0.3 g of a 5-times diluted aqueous solution of the aqueous ink being filtered through a filter having a pore size of 0.2 μm 15 minutes after preparation of the mixture, and as (B) an absorbance at a maximum absorption wavelength in the visible region of a mixture of 0.3 g of the 5-times diluted aqueous solution of the aqueous ink and 50 g of pure water, the value of the reactivity (A)/(B) was found.

(2) Abrasion Resistance:

At an elapsed time of 1 minute after MS gothic, 14-point characters and a 2-cm square solid area were printed, each printed area was rubbed with a finger to evaluate it in accordance with the following standard. The results are shown in Table 1.

A: Abrasion is scarcely observed at both character-printed area and solid-printed area, and no finger is soiled, B: Character-printed area or solid-printed area is abraded, and the finger is also soiled.

(3) Evaluation as to Strike-Through Property:

A 2-cm square solid area was printed to visually observe the degree of strike-through of the ink from the backside of the printed surface, thereby evaluating it as to strike-through property in accordance with the following standard. The results are shown in Table 1.

TABLE 1

|  | Ink set | | Reactivity | Abrasion resistance | Strike-through property |
|---|---|---|---|---|---|
|  | Reaction liquid | Ink | | | |
| Example 1 | 1 | 1 | 0.65 | A | A |
| 2 | 1 | 2 | 0.36 | A | A |
| 3 | 1 | 3 | 0.49 | A | A |
| 4 | 1 | 4 | 0.74 | A | A |
| 5 | 1 | 5 | 0.70 | A | A |
| 6 | 1 | 6 | 0.77 | A | A |
| 7 | 1 | 7 | 0.49 | A | A |
| Comp. 1 | 1 | 8 | <0.10 | B | A |
| Example 2 | 1 | 9 | 0.25 | B | A |
| 3 | 1 | 10 | >0.90 | A | B |

A: Strike-through of the ink is scarcely observed,
B: Strike-through of the ink is observed.

Incidentally, the abrasion resistance of the prints obtained by examples 1 to 5, in which the formation of images was conducted with each of the inks containing an anionic polymer dispersant comprising a monomer having a non-ionic substituent group as a structural unit was superior to the abrasion resistance of the prints obtained by examples 6 and 7, in which the formation of images was conducted with each of the inks containing no anionic polymer dispersant comprising a monomer having a nonionic substituent group as a structural unit.

This application claims priority from Japanese Patent Application Nos. 2004-075358, 2004-075359 and 2004-075360 filed on Mar. 16, 2004, respectively and Japanese Patent Application No. 2005-067994 filed on Mar. 10, 2005, which are hereby incorporated by reference herein.

What is claimed is:

1. An aqueous ink used in a system for forming an image using a reaction liquid containing at least a polyvalent metal and an aqueous ink containing at least a pigment dispersion in which a pigment is dispersed with an anionic polymer dispersant, wherein the aqueous ink satisfies the following condition:

Taking as (A) an absorbance at a maximum absorption wavelength in a visible region (at a wavelength of 550 nm when carbon black is used as the pigment) of a mixture of 50 g of an 800-times diluted aqueous solution of the reaction liquid and 0.3 g of a 5-times diluted aqueous solution of the aqueous ink being filtered through a filter having a pore size of 0.2 μm 15 minutes after preparation of the mixture, and as (B) an absorbance at a maximum absorption wavelength in the visible region of a mixture of 0.3 g of the 5-times diluted aqueous solution of the aqueous ink and 50 g of pure water, (A) and (B) satisfy the following relationship:

0.3<(A)/(B)<0.85.

2. The aqueous ink according to claim 1, wherein the anionic polymer dispersant has a component that controls reaction of the aqueous ink and the polyvalent metal.

3. The aqueous ink according to claim 2, wherein the component that controls reaction of the aqueous ink and the polyvalent metal is a nonionic substituent group.

4. The aqueous ink according to claim 1, wherein the anionic polymer dispersant comprises at least a monomer of a formula (1) as a structural unit, and a proportion of the structural unit is from 5 mass % to 50 mass % based on the total amount of the polymer:

$$CH_2=C(R_1)COOR_2 \qquad \text{formula (1):}$$

wherein $R_1$ is hydrogen or a methyl group, $R_2$ is—$(CH_2CH_2O)_n$—$R_3$ (n being an integer of 1 to 30), and $R_3$ is hydrogen or a methyl group.

5. The aqueous ink according to claim 1, wherein the anionic polymer comprises at least one selected from a monomer of a formula (2) and a monomer of a formula (3) as a structural unit:

$$CH_2=C(R_4)-R_5 \qquad \text{formula (2):}$$

wherein $R_4$ is hydrogen or a methyl group, and $R_5$ is a phenyl or naphthyl group; and $$CH_2=C(R_6)COOR_7 \qquad \text{formula (3):}$$

wherein $R_6$ is hydrogen or a methyl group, and $R_7$ is a linear, branched or alicyclic alkyl or alkenyl group having 6 to 18 carbon atoms, or a benzyl group.

6. The aqueous ink according to claim 1, wherein the anionic polymer dispersant comprises at least one selected from a monomer of the formula (2) and a monomer of the formula (3) as a structural unit, and a proportion of the structural unit is from 20 mass % to 80 mass % based on the total amount of the polymer.

7. The aqueous ink according to claim 1, wherein the pigment dispersion is such that 100 parts by mass of the pigment is dispersed with 20 parts by mass to 200 parts by mass of the anionic polymer dispersant.

8. The aqueous ink according to claim 1, wherein the anionic polymer dispersant comprises at least two anionic polymers (hereinafter referred to as Polymer (I) and Polymer (II)).

9. The aqueous ink according to claim 8, wherein Polymer (I) comprises at least one selected from a monomer of a formula (4) and a monomer of a formula (5) as a structural unit, and a proportion of the structural unit is from 50 mass % to 80 mass % based on the total amount of Polymer (I):

$$CH_2=C(R_8)-R_9 \qquad \text{formula (4):}$$

wherein $R_8$ is hydrogen or a methyl group, and $R_9$ is a phenyl or naphthyl group; and $$CH_2=C(R_{10})COOR_{11} \qquad \text{formula (5):}$$

wherein $R_{10}$ is hydrogen or a methyl group, and $R_{11}$ is a linear, branched or alicyclic alkyl or alkenyl group having 4 to 18 carbon atoms, or a benzyl group.

10. The aqueous ink according to claim 8, wherein Polymer (I) comprises styrene as a structural unit.

11. The aqueous ink according to claim 8, wherein Polymer (II) comprises at least a monomer of a formula (6) as a structural unit, and a proportion of the structural unit is from 20 mass % to 80 mass % based on the total amount of Polymer (II):

$$CH_2=C(R_{12})COOR_{13} \qquad \text{formula (6):}$$

wherein $R_{12}$ is hydrogen or a methyl group, and $R_{13}$ is a linear or branched alkyl group having less than 4 carbon atoms.

12. The aqueous ink according to claim 8, wherein Polymer (II) comprises a monomer having a nonionic substituent group as a structural unit.

13. The aqueous ink according to claim 12, wherein Polymer (II) comprises a monomer of a formula (7) as a structural unit, and a proportion of the structural unit is from 5 mass % to 50 mass % based on the total amount of Polymer (II):

$$CH_2=C(R_{14})COOR_{15} \qquad \text{formula (7):}$$

wherein $R_{14}$ is hydrogen or a methyl group, $R_{15}$ is —$(CH_2CH_2O)_n$—$R_{16}$ (n being an integer of 1 to 30), and $R_{16}$ is hydrogen or a methyl group.

14. The aqueous ink according to claim 8, wherein a total mass of Polymer (I) and Polymer (II) is from 20 parts by mass to 200 parts by mass per 100 parts by mass of the pigment.

15. The aqueous ink according to claim 8, wherein a proportion of Polymer (II) to Polymer (I) is from 10 parts by mass to 300 parts by mass per 100 parts by mass of Polymer (I).

16. A set of a reaction liquid and an aqueous ink, wherein the reaction liquid contains at least a polyvalent metal, and the aqueous ink is the aqueous ink according to any one of claims 1 to 15.

17. An image forming method for forming an image on a recording medium, which comprises using the set of the reaction liquid and the aqueous ink according to claim 16 and applying the reaction liquid in an amount of from 0.5 $g/m^2$ or more to 5 $g/m_2$ or less to the recording medium.

18. An image forming method for forming an image on a recording medium, which comprises the steps of (i) applying to the recording medium by an ink-jet recording method an aqueous ink which composes a set of a reaction liquid containing at least a polyvalent metal and the aqueous ink containing at least a pigment dispersion in which a pigment is dispersed with an anionic polymer dispersant; and (ii) applying to the recording medium, the reaction liquid which composes the set of the reaction liquid containing at least the polyvalent metal and the aqueous ink containing at least the pigment dispersion in which the pigment is dispersed with the anionic polymer dispersant, wherein the aqueous ink is the aqueous ink according to claim 1, and wherein the step (i) is conducted after the fixation of the reaction liquid to the recording medium is completed in the step (ii).

* * * * *

UNITED STATES PATENT AND TRADEMARK OFFICE
CERTIFICATE OF CORRECTION

PATENT NO. : 7,377,631 B2  Page 1 of 2
APPLICATION NO. : 11/224993
DATED : May 27, 2008
INVENTOR(S) : Yoichi Takada et al.

It is certified that error appears in the above-identified patent and that said Letters Patent is hereby corrected as shown below:

COLUMN 7
Line 28, "more amount" should read --greater amount--.

COLUMN 19
Line 30, "to present" should read --to be present--.
Line 43, "to present" should read --to be present--.

COLUMN 21
Line 61, "an" should read --a--.

COLUMN 22
Line 22, "15" should read --14--.
Line 25, "float 15" should read --float 14--.

COLUMN 23
Line 61, "that" should read --that has--.

COLUMN 24
Line 22, "begins" should read --begin--.

COLUMN 25
Line 13, "hydroxide))" should read --hydroxide)]--.
Line 61, "(styrene/" should read --[styrene/--.

COLUMN 26
Line 15, "hydroxide)" should read --hydroxide]--.
Line 26, "(styrene/M230G" should read --[styrene/M230G--.

Signed and Sealed this

Twenty-seventh Day of July, 2010

David J. Kappos
*Director of the United States Patent and Trademark Office*

COLUMN 30
Line 1, "is—" should read --is--.
Line 2, "($CH_2$" should read -- —($CH_2$--.
Line 59, "sub" should read --sub- --.

COLUMN 31
Line 20, "$m_2$" should read --$m^2$--.